United States Patent [19]

Oraby

[11] Patent Number: 5,663,073
[45] Date of Patent: Sep. 2, 1997

[54] EARTH FORMATION POROSITY ESTIMATION METHOD

[75] Inventor: Moustafa E. T. Oraby, Plano, Tex.

[73] Assignee: Atlantic Richfield Company, Los Angeles, Calif.

[21] Appl. No.: 989,863

[22] Filed: Dec. 14, 1992

[51] Int. Cl.$^6$ ............................ E21B 49/00; G01N 15/08
[52] U.S. Cl. ............................ 436/28; 73/38; 73/152.05; 73/152.14; 324/333
[58] Field of Search ............................ 73/153, 151, 38; 324/332, 333; 436/28

[56] References Cited

U.S. PATENT DOCUMENTS

| | | | |
|---|---|---|---|
| 2,528,882 | 11/1950 | Hayward | 73/153 |
| 2,648,056 | 8/1953 | Jakosky | 73/151 |
| 3,802,259 | 4/1974 | Eckels | 73/153 |
| 4,543,821 | 10/1985 | Davis | 73/153 |
| 4,644,283 | 2/1987 | Vinegar | 73/153 |
| 4,716,973 | 1/1988 | Cobern | 73/155 |
| 4,981,036 | 1/1991 | Curry | 73/151 |
| 5,095,745 | 3/1992 | Desbrandes | 73/153 |

*Primary Examiner*—Timothy McMahon
*Attorney, Agent, or Firm*—Albert C. Metrailer

[57] ABSTRACT

A method for determined porosity of an earth formation surrounding a borehole without prior knowledge of formation lithology. Neutron logging tools are used to measure thermal neutron porosity, epithermal neutron porosity and formation absorption cross section. Two calculating methods are used for a series of assumed porosity values to calculate matrix diffusion length. Matrix diffusion lengths calculated by the two methods are compared to find the highest assumed porosity for which the calculated diffusion lengths are substantially the same. This highest porosity value is the actual formation porosity.

6 Claims, No Drawings

EARTH FORMATION POROSITY ESTIMATION METHOD

BACKGROUND OF THE INVENTION

The present invention relates to methods for determining the porosity of earth formations surrounding a borehole by use of known neutron logging methods, but without any prior knowledge of formation lithology.

Numerous logging methods are used in efforts to determine the characteristics of the earth formations surrounding boreholes which have been drilled for production of oil, gas, or other minerals. For example, electrical resistance is measured in an effort to distinguish between the types of liquids in the formation pore space, for example, to distinguish between water and either oil or gas. Other logging techniques use various neutron measurements to distinguish between various types of minerals which make up the lithology of the formations surrounding boreholes. Sonic logs are used to determine formation acoustic velocity and to possibly identify fractures. However, all of these logging techniques share a common problem. In general, none of the measurements is a direct measurement of the characteristic being investigated. In nearly every case, the actual logging tool measurements or outputs must be analyzed in order to make an estimate of the characteristics, such as mineral type or porosity which is being studied.

The determination of porosity from the various log measurements has been one of the most difficult problems faced by log analysts. Many models have been introduced which combine more than one log to form a series of linear or sometimes nonlinear equations where the unknowns are porosity and the mineral volumes in the reservoir. The number of equations that can be used depends on the number of logs that have been run, so that the more logs the better the estimate. For the all of the prior methods to be accurate, a great amount of work should be given to identifying the formation lithology, that is, the mineral content of the matrix rock forming the formation. If this is not measured directly from core samples or drill cuttings, then it must be estimated. The accuracy of the porosity estimations is of course a function of the accuracy of such estimates.

SUMMARY OF THE INVENTION

The present invention provides a method for estimating the porosity of an earth formation surrounding a borehole without any prior knowledge of the formation lithology itself. Three neutron logging measurements are required for this method: thermal neutron porosity, epithermal neutron porosity, and formation absorption cross section. In one embodiment, only the first two measurements are required, and formation absorption cross section is estimated from the thermal neutron porosity and epithermal neutron porosity measurements. After obtaining these measurements, they are used to calculate matrix diffusion length in two different ways based upon a series of assumed porosity values. In the first way, matrix diffusion length is determined from the measured thermal neutron porosity and epithermal neutron porosity values. In the second, all three measured values, that is thermal neutron porosity, epithermal neutron porosity and formation absorption cross section are used to determine matrix diffusion length. The calculated matrix diffusion lengths from the two methods are compared for a number of assumed porosity value in order to find the highest assumed porosity value for which the calculated matrix diffusion lengths are substantially the same. This assumed porosity value is then taken as the actual formation matrix porosity value.

DESCRIPTION OF THE PREFERRED EMBODIMENTS

The first step of the method of the present invention is to use commercially available logging tools to obtain various neutron measurements in a borehole passing through an earth formation of interest. As used herein the term "log" means a series of measurements of a given value taken at various depths in a borehole. The measurements are usually recorded on digital magnetic tape for use with computers. Logs are generally displayed as a plot of the measured values versus depth in the borehole. The porosity estimation method described herein is to be performed at each separate depth in the borehole using values obtained from various logs for that particular borehole depth.

In the preferred embodiment, a logging tool provided by Schlumberger Technology Corporation known as the Dual Porosity Compensated or CNT-G tool was used to measure thermal neutron porosity and epithermal neutron porosity. Both of these measurements can be made by the same tool in one logging operation. In the preferred embodiment, a separate tool is used to measure formation absorption cross-section. A tool appropriate for this purpose is also available from Schlumberger and is known as the Accelerator Porosity Sonde or APS. However, if it is desired to minimize logging expense by running the minimum number of logging tools, the formation absorption cross section can be estimated from the results of the thermal neutron porosity and epithermal neutron porosity logs. Use of such an estimate will, however, be less accurate.

The epithermal neutron porosity logging tool response or output, hereinafter referred to as "$E_T$", is then used to determine the neutron slowing down length which is a function of the distance between the neutron source in the logging tool and the point where the energy of the neutron becomes thermal. Various methods are available for determining the slowing down length, $L_S$, from $E_T$. A simplified formula useful with the tool used in the present invention is provided in equation 1.

$$E_T = \frac{296.9}{L_S^{2.9073}} - 0.0277 \tag{1}$$

The thermal neutron porosity measurement is then used to determine the neutron migration length, $L_M$. The migration length is a combination of the neutron slowing down length described above and the neutron diffusion length, $L_D$. The neutron diffusion length is a function of the distance between the point where the neutron is at thermal energy and the absorption point. The migration length is a combination of the slowing down length and the diffusion length. The neutron migration length, $L_M$, can be determined from the thermal neutron porosity measurement according to formula 2.

$$T_T = \frac{51.9}{L_M^{2.0181}} - 0.0455 \tag{2}$$

The formation diffusion length, $L_D$, can then be determined from equation 3.

$$L_D^2 = L_M^2 - L_S^2 \tag{3}$$

The measured or previously calculated formation absorption cross section, $A_T$, can then be used to determine the diffusion coefficient for the total measured formation, $D_T$, according to equation 4.

$$A_T = \frac{D_T}{L_D^2} \quad (4)$$

All of the calculations described above involve determination of various nuclear parameters of the total measured formation, including both the rock matrix and the fluid in the pore space. The following steps of the method involve making estimations of these same parameters for the matrix materials only based on various assumed porosity values. By using these parameters to determine diffusion length of the unknown matrix in two different ways I have found that it is possible to identify the actual formation porosity without knowing the mineral content of the formation. I have found that the highest porosity value for which matrix diffusion length calculated by two independent methods are substantially the same, is in fact the true porosity value. The diffusion lengths for lower porosity values will also be substantially the same, but will not be the actual porosity values.

Since the porosity values below the actual matrix porosity will all give corresponding diffusion length results, I prefer starting with a very high assumed porosity such as 30%. Lower porosity values are then repetitively used until diffusion lengths calculated by two different methods converge on substantially the same value. The first method for measuring diffusion length uses the actual tool responses $T_T$ and $E_T$. For a given porosity and assuming water in the pore space, equations 5 and 6 can be used to determine the matrix thermal neutron porosity, $T_M$, and the matrix epithermal neutron porosity, $E_M$.

$$T_T = P + (1-P)T_M \quad (5)$$

$$E_T = P + (1-P)E_M \quad (6)$$

Then the matrix migration length, $L_{MM}$, and the matrix slowing down length, $L_{SM}$, can be determined from simplified equation 7 and 8 which correspond to equations 1 and 2.

$$T_M = \frac{51.9}{L_{MM}^{2.0181}} - 0.0455 \quad (7)$$

$$E_M = \frac{296.9}{L_{SM}^{2.9073}} - 0.0277 \quad (8)$$

The matrix diffusion length, $L_{DM}$, can then be determined from equation 9 which corresponds to equation 3.

$$L_{DM}^2 = L_{MM}^2 - L_{SM}^2 \quad (9)$$

The next step in the process is to calculate the matrix diffusion length, $L_{DM}$, for the same assumed porosity, but using a separate set of inputs and method of calculation. In this embodiment, the second method begins with the total formation thermal neutron porosity, $T_T$, and the total formation epithermal neutron porosity $E_T$, and the measured total formation absorption cross section $A_T$. As noted above, these values have been used to determine the total formation diffusion coefficient, $D_T$. This second calculation path begins by determining an assumed matrix absorption cross section, $A_M$ from equation 10 for the same assumed porosity as used in the first calculation path. In equation 10, a value for the pore fluid absorption cross section, $A_F$, must be assumed. For either fresh water or oil, a value of 22.2CU, i.e. capture units, is appropriate for this purpose.

$$A_T = A_F P + A_M(1-P) \quad (10)$$

The matrix diffusion coefficient, $D_M$, may then be determined from equation 11 where the total formation diffusion coefficient, $D_T$, has been determined from equation 4 and the diffusion coefficient for the pore fluid, $D_F$, is an assumed value for the water or oil in the pore fluid which may be 0.15. The matrix absorption cross section, $A_M$, determined from equation 10, and the matrix diffusion coefficient, $D_M$, determined from equation 11, may then be used in equation 12 to determine the matrix diffusion length by this second path.

$$\frac{1}{D_T} = \frac{P}{D_F} + \frac{(1-P)}{D_M} \quad (11)$$

$$A_M = \frac{D_M}{L_{DM}^2} \quad (12)$$

At this point in the process, matrix diffusion length, $L_{DM}$ has been calculated by two separate calculation paths. These two calculation paths are then repeated for a plurality of other assumed porosity values, P. As noted above, it is preferred to start with an assumed porosity of about 30% and then to gradually reduce the assumed porosity values until the calculated diffusion rates converge on substantially the same value. When this occurs, the assumed porosity value is the actual matrix porosity value.

The method will also work by starting with a very low assumed porosity value and gradually increasing this value until diffusion lengths calculated by the two paths begin to diverge.

As noted above, the complete process is to be performed for a given depth in the borehole to estimate formation porosity at that selected depth. The process may then be repeated for other selected depths or for all depths for which data is taken in the borehole. The porosity values may then be displayed or plotted versus depth to provide a log of formation porosity for the well in question. The process is preferably automated so that the recorded logging tool measurements may be automatically used to generate the porosity log for display in conjunction with other available logs for the well.

While the present invention has been described with reference to particular methods of calculated various value, it is apparent that other calculation methods may be used to accurately estimate formation porosity according the present invention as defined by the appended claims.

What is claimed is:

1. A method for determining porosity of an earth formation surrounding a borehole without knowledge of the formation minerals or lithology comprising:

(a) using a logging tool in the borehole to measure thermal neutron porosity, epithermal neutron porosity and formation absorption cross section;

(b) assuming a first porosity value;

(c) using said first assumed porosity, calculating matrix diffusion length from measured thermal neutron porosity and epithermal neutron porosity;

(d) using said first assumed porosity, calculating matrix diffusion length from measured thermal neutron porosity, epithermal neutron porosity, and formation absorption cross section;

(e) repeating steps (c) and (d) for a plurality of other assumed porosities;

(f) comparing the diffusion lengths from steps (c) and (d) for each assumed porosity to find the highest assumed porosity for which the calculated diffusion lengths are substantially the same, and selecting said highest assumed porosity as the actual formation porosity.

2. The method of claim 1 wherein each of the steps (a) through (f) are repeated for a plurality of depth locations within the borehole.

3. The method of claim 2, wherein the selected porosity values are displayed versus borehole depth to provide a log of formation porosity for the borehole.

4. A method for determining porosity of an earth formation surrounding a borehole without knowledge of the formation minerals or lithology comprising:

(a) using a logging tool in the borehole to measure thermal neutron porosity and epithermal neutron porosity;

(b) calculating formation absorption cross section from the measured values of thermal neutron porosity and epithermal neutron porosity;

(c) assuming a first porosity value;

(d) using said first assumed porosity, calculating matrix diffusion length from measured thermal neutron porosity and epithermal neutron porosity;

(e) using said first assumed porosity, calculating matrix diffusion length from measured thermal neutron porosity, epithermal neutron porosity, and formation absorption cross section;

(f) repeating steps (d) and (e) for a plurality of other assumed porosities;

(g) comparing the diffusion lengths from steps (d) and (e) for each assumed porosity to find the highest assumed porosity for which the calculated diffusion lengths are substantially the same, and selecting said highest assumed porosity as the actual formation porosity.

5. The method of claim 4 wherein each of the steps (a) through (g) are repeated for a plurality of depth locations within the borehole.

6. The method of claim 5, wherein the selected porosity values are displayed versus borehole depth to provide a log of formation porosity for the borehole.

* * * * *